Sept. 20, 1960

D. B. SPALDING 2,952,986

PRESSURE EXCHANGERS

Filed July 23, 1958

INVENTOR
*Dudley Brian Spalding*
BY
*Larson and Taylor*
ATTORNEYS

United States Patent Office 2,952,986
Patented Sept. 20, 1960

2,952,986
PRESSURE EXCHANGERS
Dudley Brian Spalding, 2 Vineyard Hill Road,
Wimbledon, London, England
Filed July 23, 1958, Ser. No. 750,427
Claims priority, application Great Britain July 25, 1957
9 Claims. (Cl. 62—38)

The invention relates to pressure exchangers and is particularly concerned with pressure exchangers capable of liquefying gas.

A pressure exchanger comprises cells in which one gas expands so compressing another gas, ducting to lead gas streams steadily to and from the cells at different pressures and means to effect relative motion between the cells and the ducting.

According to the present invention, there is provided a gas liquefaction apparatus including a pressure exchanger comprising an inlet duct to introduce a first gas stream to cells of the pressure exchanger, a first outlet duct communicating with the cells immediately following closure to the inlet duct and positioned to communicate with the same ends of the cells as the first inlet duct, a second inlet duct communicating with ends of the cells remote from the first inlet duct at a position before communication of the cells with the first inlet duct and a second outlet duct communicating with the cells at the same ends of the cells as the second inlet duct, the first outlet duct being subdivided to receive a relatively cooler gas stream in a first subdivision and a relatively hotter gas stream in a second subdivision.

The second inlet duct may be arranged to communicate with the cells immediately before the second outlet duct. The first and second inlet ducts and the first and second outlet ducts taken together may have a substantially X configuration in the region of their communication with the cells.

Preferably the apparatus includes a heat exchanger, the hotter pass of which is connected to the first inlet duct and the colder pass of which is connected to the colder gas subdivision of the first outlet duct. A duct connection may be provided to connect the hotter pass of the heat exchanger to a compressor.

A cooler may be connected to the second outlet duct and to the hotter pass of the heat exchanger. The second subdivision of the first outlet duct may be connected to the colder pass of the heat exchanger at a point intermediate the ends of the pass.

Figure 1:
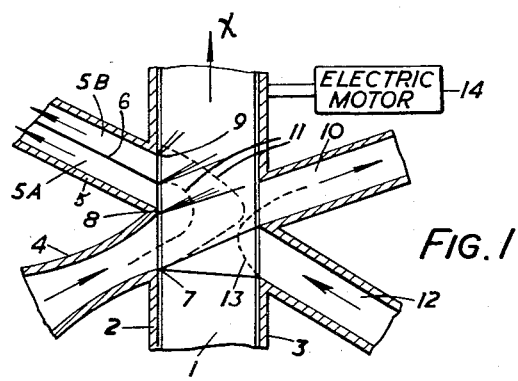
Figure 2:
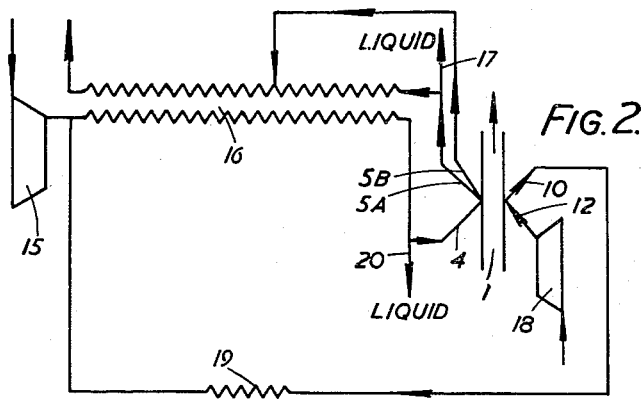

By way of example, an embodiment of the invention will now be described with reference to the accompanying diagrammatic drawings, in which:

Figure 1 shows a peripheral development of a pressure exchanger in accordance with the invention; and Figure 2 is a cycle diagram incorporating the pressure exchanger shown in Figure 1.

In Figures 1 and 2 the pressure exchanger cell ring 1 has been shown simply as two axially spaced parallel lines representing end faces of the cell ring. It must be understood that partitions defining cells extend transversely between the end faces, but for simplicity these have been omitted from the figures. In the pressure exchanger according to the invention, compression and expansion of gas in the cells are produced by shock and expansion waves set up on opening and closing cells to ducts containing gas at a higher or a lower pressure respectively than the pressure of gas already in the cells.

In Figure 1 shock waves (compression waves) are represented by single full lines and expansion waves are represented by a fan of radiating full lines extending partly across the cell ring. The curved broken lines represent probable lines of demarcation between two gases contained in the cells.

Referring to Figure 1, a cell ring 1 is arranged to rotate in the direction of an arrow X between stationary end plates 2 and 3. The end plate 2 has an inlet port communicating with a first inlet duct 4. The end of the duct 4 is shaped as a convergent/divergent nozzle in view of the probable high velocity of gas flow therethrough. Immediately adjacent the port communicating with the duct 4 and also in the end plate 2 there is an outlet port communicating with a first outlet duct 5. This outlet duct 5 is subdivided into two subdivisions 5A and 5B by a partition 6. In the end plate 3 there is an outlet port communicating with a second outlet duct 10 and an inlet port communicating with a second inlet duct 12.

An electric motor 14 is provided to effect rotation of the cell ring 1 between the stationary end-plates 2 and 3.

In operation a stream of gas (e.g. air) enters the second inlet duct 12 and passes into the cells preceded by a shock wave which reaches the opposite end of the cells at the leading edge 7 of the first inlet port. A stream of gas, some of which is to be expanded to an extent to produce liquefaction, enters the cells at a relatively high total head pressure through the duct 4 and is preceded by a shock wave which reaches the opposite end of the cells at the land 21. The total head pressures of the gases entering the cells from the ducts 12 and 4, and the speed of the rotor 1, are selected so that the gas entering through the duct 12 together with some of the gas already in the cells passes out through the duct 10, and substantially the whole of the gas entering the cells from the duct 4 passes out through the duct 5.

This gas passing out through the duct 5 is expanded through the expansion waves approximately isentropically and therefore passes out through the duct 5 colder than it entered through the duct 4. Gas leaving the cells through the subdivision 5A passes through a first and more intense series of expansion waves, emanating from the land 8, than that leaving through the subdivision 5B which passes through a dispersed and weaker portion of the series of expansion waves emanating from the land 8, and a considerably weaker second series of expansion waves emanating from the edge of the partition 6. The gas in subdivision 5A is therefore colder than that in subdivision 5B. The broken curved lines 11 and 13 indicate the probable lines of demarcation between gas which has entered the cells through the duct 4, gas which has entered the cells through the duct 12 and gas already in the cells. The line of demarcation 11, between gas introduced through the duct 4 and gas already in the cells, does not reach the end plate 2 before the point 9 while the line of demarcation 13, between gas introduced through the duct 12 and gas already in the cells, does not reach the trailing edge of the outlet duct 10. The arrangement of the demarcation lines as shown reduces the possibility of gas introduced through the duct 12 mixing with the gas introduced through the duct 4 also reduces the possibility of gas already in the cells from leaving through the duct 5. The gas introduced to the cells through the duct 12 which has been compressed by the introduction of gas through the duct 4 leaves through the duct 10. The ducts are inclined to the axis of rotation of the cell ring at angles appropriate for the gas velocity and the rotational speed of the cell ring, the gases in each of the ducts having a component of motion in the direction of cell rotation. The ports in the end plate 3 preferably occupy a large part of the periphery of the cell ring; the spacing between the ports leading to the ducts 10 and 12 in the direction of arrow X being dependent upon the angular position of the ducts.

In the arrangement of Figure 2 the pressure exchanger of Figure 1 is incorporated in a modified Claude cycle. The cycle includes a compressor 15 connected to the inlet end of the hotter pass of a heat exchanger 16 and a compressor 18 connected to the second inlet duct 12 of the pressure exchanger. The outlet end of the hotter pass of the heat exchanger is connected to the first inlet duct 4 and a branch 20 serves to drain off any liquefied gas from this pass of the heat exchanger. The second outlet duct 10 of the pressure exchanger is connected to a cooler 19 which is in turn connected to the inlet end of the hotter pass of the heat exchanger 16.

The subdivision 5A of the first outlet duct 5 of the pressure exchanger is connected to the inlet end of the colder pass of the heat exchanger 16 and a drain 17 serves to remove any liquefied gas from the subdivision 5A. The subdivision 5B is connected to the colder pass of the heat exchanger at a point intermediate the inlet and outlet of this pass. The outlet end of the colder pass is open to atmosphere.

The cycle operates as follows: Compressed air is introduced to the hot pass of the heat exchanger 16 by the compressor 15 and after cooling by heat exchange with colder air in the colder pass is led into the cells 1 of the pressure exchanger through the first inlet duct 4. As explained with reference to Figure 1 the air is cooled by expanding substantially isentropically and leaves partly through the subdivision 5A and partly through the subdivision 5B of the first outlet duct 5. The colder gas and liquid in the subdivision 5A are then separated, the liquid leaving the cycle through the drain 17 and the cold gas entering the inlet end of the colder pass of the heat exchanger 16. The warmer gas in the subdivision 5B enters the colder pass of the heat exchanger at a point intermediate the ends.

Air compressed in the compressor 18 is introduced to the pressure exchanger through the second inlet duct 12 where it is compressed and leaves through the second outlet duct 10. The heated compressed air then passes through the cooler 19 and subsequently enters the hot pass of the heat exchanger 16.

This arrangement is believed to have several advantages over the Claude process, namely higher efficiency, smaller size and a simpler mechanical construction of the expansion engine (i.e. the pressure exchanger) and recovery through the duct 10 and the cooler 19 of some of the compressed air.

With pressure exchanger apparatus as described herein, a gas may be expanded in a single stage of operation through a large pressure ratio. A turbine expander often has more than one stage of expansion and is therefore bulky. If there were a single stage rotor only, this would need to be operated at a very high rotational speed in order to attain the same degree of expansion. Pressure exchanger apparatus as described herein may be relatively compact, and the rotational speed of the cell ring may be lower than that of a turbine acting as an expander. Furthermore, pressure exchanger apparatus as described is particularly suitable for expanding a gas stream sufficiently to cause liquefaction, for example by a modification of the Claude process.

What I claim is:

1. Gas liquefaction apparatus including a pressure exchanger comprising a first inlet duct to introduce a gas stream to cells of the pressure exchanger, a first outlet duct communicating with the cells immediately following closure to the first inlet duct and positioned to communicate with the same ends of the cells as the first inlet duct, a second inlet duct communicating with ends of the cells remote from the first inlet duct at a position before communication of the cells with the first inlet duct and a second outlet duct communicating with the cells at the same end of the cells as the second inlet duct, the first outlet duct being subdivided to receive a relatively cooler gas stream in a first subdivision and a relatively hotter gas stream in a second subdivision.

2. Gas liquefaction apparatus including a pressure exchanger as claimed in claim 1, in which the second outlet duct is arranged to communicate with the cells immediately after the second inlet duct.

3. Gas liquefaction apparatus including a pressure exchanger as claimed in claim 2, in which the first and second inlet ducts and the first and second outlet ducts taken together have a substantially X configuration in the region of their communication with the cells.

4. Gas liquefaction apparatus including a pressure exchanger as claimed in claim 2, including a heat exchanger, the outlet end of the hotter pass of which is connected to the first inlet duct and the inlet end of the colder pass of which is connected to the colder gas subdivision of the first outlet duct.

5. Gas liquefaction apparatus as claimed in claim 4, including a compressor and a duct connection from the output of the compressor to the inlet end of the hotter pass of the heat exchanger.

6. Gas liquefaction apparatus as claimed in claim 4, including a cooler connected to the second outlet duct, and a duct connection from the cooler to the inlet end of the hotter pass of the heat exchanger.

7. Gas liquefaction apparatus as claimed in claim 6 in which the second subdivision of the first outlet duct is connected to the colder pass of the heat exchanger at a point intermediate the ends of the pass.

8. Gas liquefaction apparatus as claimed in claim 1, in which the gas passage formed by the first inlet duct is of convergent/divergent configuration.

9. Gas liquefaction apparatus as claimed in claim 7, including a second compressor and a duct connection from the output of the second compressor to the second inlet duct of the pressure exchanger.

References Cited in the file of this patent

UNITED STATES PATENTS

| | | |
|---|---|---|
| 2,399,394 | Seippel | Apr. 30, 1946 |
| 2,764,340 | Jendrassik | Sept. 25, 1956 |
| 2,867,981 | Berchtold | Jan. 13, 1959 |